United States Patent
Park et al.

(10) Patent No.: US 9,360,699 B2
(45) Date of Patent: Jun. 7, 2016

(54) DISPLAY SUBSTRATE AND METHOD OF MANUFACTURING THE SAME

(71) Applicant: Samsung Display Co., Ltd., Yongin, Gyeonggi-Do (KR)

(72) Inventors: Kyung-Ho Park, Asan-si (KR);
Dong-Hyeon Ki, Asan-si (KR);
Seon-Kyoon Mok, Hwaseong-si (KR);
Hyung-Jin Song, Seongnam-si (KR);
Kye-Uk Lee, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 129 days.

(21) Appl. No.: 14/157,355

(22) Filed: Jan. 16, 2014

(65) Prior Publication Data

US 2014/0347612 A1 Nov. 27, 2014

(30) Foreign Application Priority Data

May 27, 2013 (KR) ........................ 10-2013-0059434

(51) Int. Cl.
*G02F 1/1337* (2006.01)
*G02F 1/1335* (2006.01)
*G02F 1/1339* (2006.01)
*G02F 1/1333* (2006.01)

(52) U.S. Cl.
CPC ........ *G02F 1/133514* (2013.01); *G02F 1/1339* (2013.01); *G02F 1/133516* (2013.01); *G02F 2001/133388* (2013.01)

(58) Field of Classification Search
CPC ................. G02F 1/133514; G02F 1/133516
USPC ............................................ 349/106; 430/7
See application file for complete search history.

(56) References Cited

U.S. PATENT DOCUMENTS

| | | | |
|---|---|---|---|
| 8,274,628 B2 * | 9/2012 | Nishi et al. ..................... | 349/122 |
| 2002/0084971 A1 | 7/2002 | Youn | |
| 2005/0284393 A1 * | 12/2005 | Chen et al. ..................... | 119/211 |
| 2006/0107143 A1 | 5/2006 | Kim et al. | |
| 2008/0137022 A1 * | 6/2008 | Komeno ............... | G02F 1/1337 349/153 |
| 2009/0077334 A1 * | 3/2009 | Ishida et al. ................... | 711/163 |
| 2010/0225875 A1 * | 9/2010 | Wang et al. .................... | 349/160 |
| 2011/0074748 A1 * | 3/2011 | Cho et al. ....................... | 345/205 |

(Continued)

FOREIGN PATENT DOCUMENTS

| | | | | |
|---|---|---|---|---|
| JP | 2007-304452 | * 11/2007 | ............ | G02F 1/1339 |
| KR | 10-2002-0056092 A | 7/2002 | | |

(Continued)

*Primary Examiner* — Sang V Nguyen
(74) *Attorney, Agent, or Firm* — Knobbe, Martens, Olson & Bear, LLP

(57) ABSTRACT

A display substrate is disclosed. In one aspect, the substrate includes a first substrate which includes a first display region, a first peripheral region and a first seal-line region and a second substrate facing the first substrate and including a second display region, a second peripheral region and a second seal-line region. The substrate also includes a sealing member formed on the first seal-line region and the second seal-line region to affix the first and second substrates and a color filter formed in the first display region. The substrate further includes a first dam formed using the same material as the color filter, formed in the first peripheral region, adjacent to the first seal-line region in the first peripheral region and a second dam formed using the same material as the color filter and formed adjacent to the first display region in the first peripheral region.

20 Claims, 13 Drawing Sheets

(56) References Cited

U.S. PATENT DOCUMENTS

| | | | | |
|---|---|---|---|---|
| 2012/0194494 A1* | 8/2012 | Jung | G02F 1/133723 | 345/208 |
| 2012/0229739 A1* | 9/2012 | Inoue | G02F 1/133753 | 349/99 |
| 2012/0268698 A1* | 10/2012 | Wang | G02F 1/133514 | 349/106 |
| 2014/0043574 A1* | 2/2014 | Ichimura | G02F 1/1339 | 349/138 |

FOREIGN PATENT DOCUMENTS

| | | |
|---|---|---|
| KR | 10-2006-0032829 A | 4/2006 |
| KR | 10-2007-0035297 A | 3/2007 |

* cited by examiner

DISPLAY SUBSTRATE AND METHOD OF MANUFACTURING THE SAME

CROSS-REFERENCE TO RELATED APPLICATIONS

This application claims priority to Korean Patent Application No. 10-2013-0059434, filed on May 27, 2013, and all the benefits accruing therefrom under 35 U.S.C. §119, the contents of which are incorporated by reference herein in their entireties.

BACKGROUND

1. Field

The described technology generally relates to a display substrate and a method of manufacturing the display substrate, more particularly, to a display substrate used for a liquid crystal display (LCD) apparatus and a method of manufacturing the display substrate.

2. Description of the Related Technology

Generally, an LCD substrate includes a first display substrate including a thin-film transistor (TFT) for driving a pixel, a second display substrate facing the first display substrate, and a liquid crystal layer interposed between the first and second display substrates. A voltage is usually applied to the liquid crystal layer to control light transmittance so that the LCD substrate displays an image. An alignment layer is often formed on each of the first and second display substrates to adjust an initial alignment of liquid crystal molecules of the liquid crystal layer. The liquid crystal molecules are interposed between the alignment layers facing each other.

A material used for the alignment layer generally includes a polyamic acid based compound for improving strength of the alignment layer or a polyimide based compound having a high voltage holding rate. These may be used alone or a combination thereof. A raw material for the alignment layer may be coated on a substrate by an ink jetting process or a rolling process to form the alignment layer. Alternatively, the alignment layer may be formed by additionally rubbing a surface of the coated raw material on the substrate.

However, when the alignment layer is formed on each of the first and second display substrates of the LCD substrate having a quadrilateral shape when viewed in a plane, generally a repulsive force between a raw material layer and patterns formed under the raw material layer is generated due to chemical characteristics of the raw material although the raw material is uniformly coated on each of the first and second display substrates. Thus, corner portions of the raw material layer are typically rolled toward an inside of each of the first and second display substrates. Accordingly, the alignment layer is often not uniformly formed on each of the first and second display substrates. Generally, the alignment layer is not easily formed on a region in which the raw material layer is not formed, and thus the liquid crystal molecules might not be controlled to decrease a display quality. The above information disclosed in this Background section is only intended to facilitate the understanding of the background of the described technology and therefore it may contain information that does not constitute the prior art that is already known in this country to a person of ordinary skill in the art.

SUMMARY OF CERTAIN INVENTIVE ASPECTS

One inventive aspect is a display substrate capable of improving reliability of an alignment layer.

Another aspect is a method of manufacturing the display substrate.

Another aspect is a display substrate which includes a first substrate including a first display region, a first peripheral region and a first seal-line region, a second substrate facing the first substrate and including a second display region, a second peripheral region and a second seal-line region, a sealing member provided on the first seal-line region and the second seal-line region to affix the first substrate and the second substrate, a color filter formed in the first display region of the first substrate, a first dam provided adjacent to the first seal-line region in the first peripheral region and including the same material as the color filter and a second dam provided adjacent to the first display region in the first peripheral region and including the same material as the color filter.

In an embodiment, the color filter may include a first color filter including a color photoresist material of a red pigment, a second color filter pattern including a color photoresist material of a green pigment and a third color filter pattern including a color photoresist material of a blue pigment.

In an embodiment, the first substrate may further include a pixel electrode formed on the color filter and a switching element formed under the color filter and electrically connected with the pixel electrode.

In an embodiment, the second substrate may further include a light-blocking member formed in the second display region and the second peripheral region to block a light.

In an embodiment, the first dam and the second dam may be formed on the same layer as the color filter.

In an embodiment, a distance between the first dam and the second dam may be substantially the same as a width of one color filter pattern.

In an embodiment, the first dam may be formed using the same material as the first color filter pattern in a left side of the display substrate and may be formed using the same material as the third color filter pattern in a right side of the display substrate.

In an embodiment, the second dam may be formed using the same material as the third color filter pattern in a left side of the display substrate and may be formed using the same material as the first color filter pattern in a right side of the display substrate.

In an embodiment, the first substrate may further include a pixel electrode formed on the color filter, a switching element formed under the color filter and electrically connected with the pixel electrode and a light-blocking member formed in the first display region and the first peripheral region to block a light.

In an embodiment, the first dam and the second dam may be formed on the same layer as the color filter.

In an embodiment, a distance between the first dam and the second dam may be same as a width of one color filter pattern.

In an embodiment, the first dam may be formed using the same material as the first color filter pattern in a left side of the display substrate and may be formed using the same material as the third color filter pattern in a right side of the display substrate.

In an embodiment, the second dam may be formed using the same material as the third color filter pattern in a left side of the display substrate and may be formed using the same material as the first color filter pattern in a right side of the display substrate.

Another aspect is a method of manufacturing a display substrate includes forming a first color filter pattern using a color photoresist material of a red pigment in a first display region and a first peripheral region of a display substrate, the display substrate comprising the first display region, the first peripheral region and a first seal-line region, forming a second color filter pattern using a color photoresist material of a green pigment in the first display region of the display substrate, forming a third color filter pattern using a color photoresist material of a blue pigment in the first display region and the first peripheral region of the display substrate and disposing a second substrate on the first display substrate to face each other, the second substrate comprising a second display region, a second peripheral region and a second seal-line region to face the first display substrate.

In an embodiment, forming the first color filter pattern and forming the third color filter pattern may use a mask whose overlapping portion is formed as a light-blocking portion.

In an embodiment, the first color filter pattern and the third color filter pattern formed in the first peripheral region may be a first dam and a second dam capable of preventing from backflow of an alignment layer.

In an embodiment, a distance between the first dam and the second dam may be substantially the same as a width of one color filter pattern.

In an embodiment, the first dam may be formed using the same material as the first color filter pattern in a left side of the display substrate and may be formed using the same material as the third color filter pattern in a right side of the display substrate.

In an embodiment, the second dam may be formed using the same material as the third color filter pattern in a left side of the display substrate and may be formed using the same material as the first color filter pattern in a right side of the display substrate.

In an embodiment, the method of manufacturing a display substrate may further include forming a light-blocking member formed between the color filter patterns of the first display region and the first peripheral region to block a light.

According to one or more exemplary embodiment, the dam is formed in a peripheral region of the display substrate prevent from being rolled toward the display region in forming the alignment layer.

Often the dam can be formed at substantially the same time as forming a pixel pattern and this can reduce the number of manufacturing processes.

BRIEF DESCRIPTION OF THE DRAWINGS

Exemplary embodiments of the described technology can be understood in more detail from the following detailed description when taken in conjunction with the accompanying drawings, in which.

DETAILED DESCRIPTION OF CERTAIN INVENTIVE EMBODIMENTS

Hereinafter, exemplary embodiments of the described technology will be explained in detail with reference to the accompanying drawings.

Figure 1:
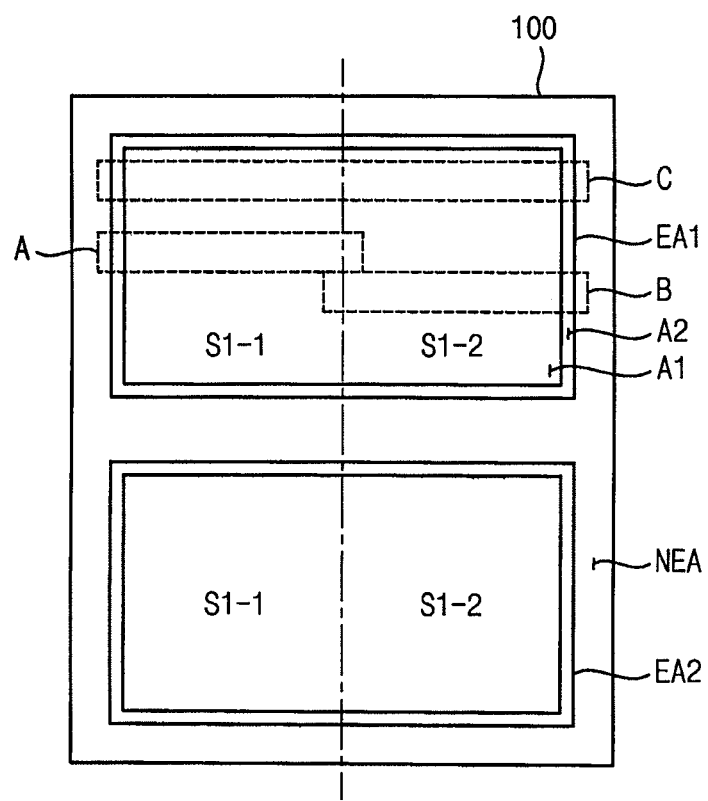
FIG. 1 is a plan view illustrating an exemplary embodiment of a mother substrate according to the described technology.
Figure 2:
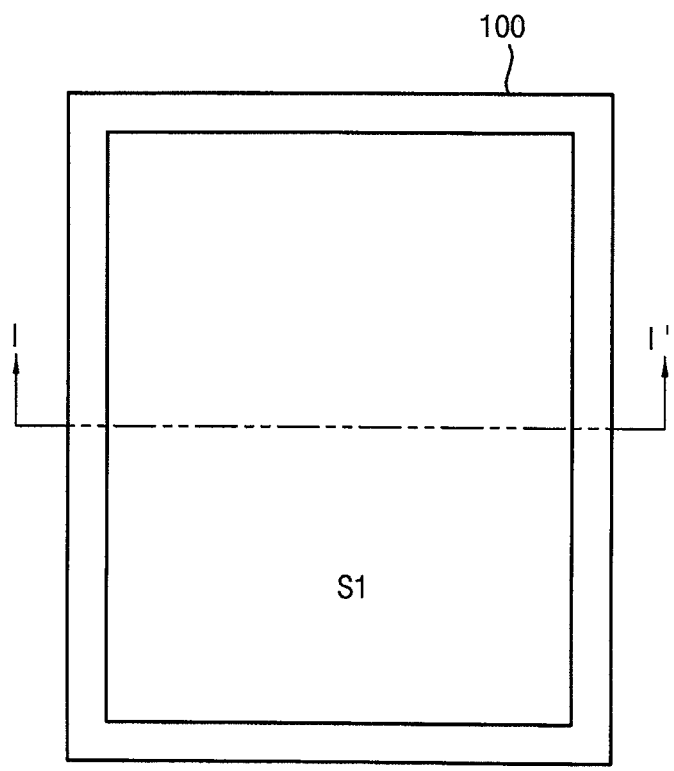
FIG. 2 is a plan view illustrating an exemplary embodiment of a mask formed on the mother substrate in FIG. 1.
Figure 3:
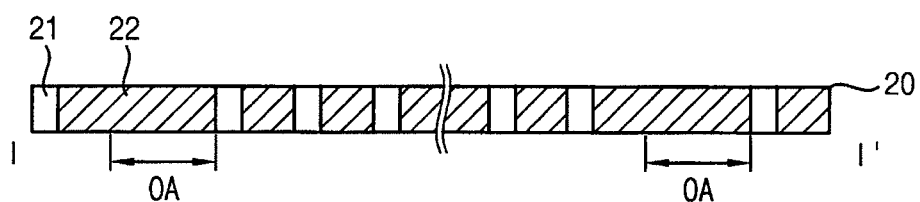
FIG. 3 is an exemplary cross-sectional view of a first mask forming a first color filter pattern taken along the line I-I' of FIG. 2.
Figure 4:
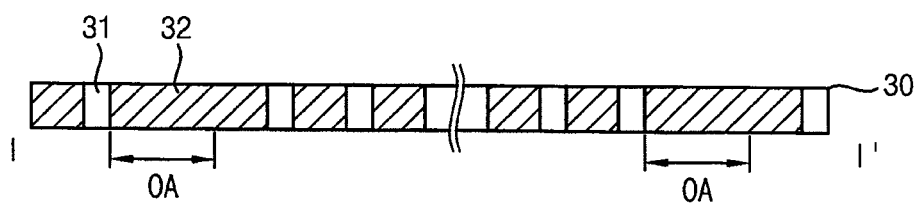
FIG. 4 is an exemplary cross-sectional view of a second mask forming a second color filter pattern taken along the line I-I' of FIG. 2.
Figure 5:
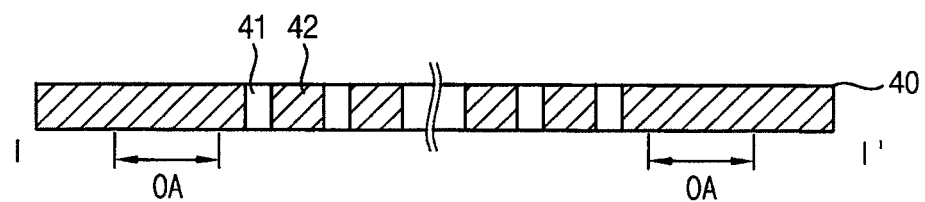
FIG. 5 is an exemplary cross-sectional view of a third mask forming a third color filter pattern taken along the line I-I' of FIG. 2.

FIG. 1 is a plan view illustrating a mother substrate according to an exemplary embodiment of the described technology. FIG. 2 is a plan view illustrating an exemplary embodiment of a mask formed on the mother substrate in FIG. 1. FIG. 3 is an exemplary cross-sectional view illustrating a first mask for forming a first color filter pattern, taken along the line I-I' of FIG. 2. FIG. 4 is an exemplary cross-sectional view illustrating a second mask for forming a second color filter pattern, taken along the line I-I' of FIG. 2. FIG. 5 is an exemplary cross-sectional view illustrating a third mask for forming a third color filter pattern, taken along the line I-I' of FIG. 2.

Referring to FIGS. 1 and 5, a mother substrate 100 includes a first effective region EA1, a second effective region EA2 and a non-effective region NEA surrounding the first effective region EA1 and the second effective region EA2. A color filter layer, a light blocking layer and a common electrode (not illustrated) may be formed in the first effective region EA1 and the second effective region EA2, respectively.

Since a mother substrate of a super-vision display substrate is large, it can be difficult to expose both of the first effective region EA1 and the second effective region EA2 at once. Accordingly, each of the first and second effective regions EA1 and EA2 is divided into a first shot region S1-1 and a second shot region S1-2. The mother substrate 100 may be exposed by a mask in twice. In some embodiments, the first effective region EA1 and the second effective region EA2 are exposed by the same mask respectively. The mask may include a first mask 20, a second mask 30 and a third mask 40. The first mask 20 may be used for forming a first color filter pattern. The second mask 30 may be used for forming a second color filter pattern. The third mask 40 may be used for forming a third color filter pattern.

As illustrated in FIG. 3, the first mask 20 may include a light transmittance portion 21 and a light blocking portion 22. The first mask 20 may be used for forming a first color filter pattern. The light transmittance portion 21 may correspond to regions for the first color filter pattern, a first dam in a left of the display substrate and a second dam in a right of the display substrate to be formed. The light blocking portion 22 may correspond to regions except for the first color filter pattern, the first dam in the left of the display substrate and the second dam in the right of the display substrate. A light may be provided to a photoresist layer through the light transmittance portion 21. A light may be blocked by the light blocking portion 22. In order to avoid a double exposure together with the second mask 30 and the third mask 40, an overlapping portion OA is formed in the light blocking portion 22.

As illustrated in FIG. 4, the second mask 30 may include a light transmittance portion 31 and a light blocking portion 32. The second mask 30 may be used for forming a second color filter pattern. The light transmittance portion 31 may correspond to regions for the second color filter pattern, a second dam in a left of the display substrate and a first dam in a right of the display substrate to be formed. The light blocking portion 32 may be corresponded to regions except for the second color filter pattern, the second dam in the left of the display substrate and the first dam in the right of the display substrate. A light may be provided to a photoresist layer through the light transmittance portion 31. A light may be blocked by the light blocking portion 32. In order to avoid a double exposure together with the first mask 20 and the third mask 40, an overlapping portion OA is formed in the light blocking portion 32.

As illustrated in FIG. 5, the third mask 40 may include a light transmittance portion 41 and a light blocking portion 42. The third mask 40 may be used for forming a third color filter pattern. The light transmittance portion 41 may correspond to a region for the third color filter pattern to be formed. The light blocking portion 42 may correspond to regions except for the third color filter pattern. A light may be provided to a photoresist layer through the light transmittance portion 41. A light may be blocked by the light blocking portion 42. In order to avoid a double exposure together with the first mask 20 and the second mask 30, an overlapping portion OA is formed in the light blocking portion 42.

Figure 6:
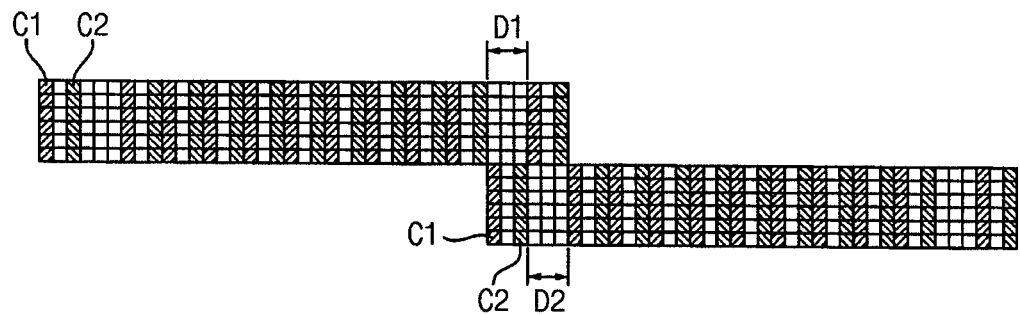
FIG. 6 is a plan view illustrating an exemplary embodiment of A and B in which the first color filter pattern and the second color filter pattern in FIG. 1 according to the described technology.

FIG. 6 is an exemplary plan view illustrating the A portion and the B portion in FIG. 1 where the first color filter pattern and the second color filter pattern are formed.

Referring to FIG. 6, a first color filter pattern C1 and a second color filter pattern C2 are formed in a first shot region S1-1 and a second shot region S1-2. The first color filter pattern C1 may be formed by the first mask 20. The second color filter pattern C2 may be formed by the second mask 30.

The first shot region S1-1 and the second shot region S1-2 may be exposed by the first mask 20 and the second mask 30 respectively. Thus, a pattern formed in the first shot region S1-1 and a pattern formed in the second shot region S1-2 may be substantially the same. Since the exposure is performed twice by the same mask, a double exposure may be performed in the overlapping regions D1 and D2. When the double exposure is performed, a stain may occur in a display device due to a step difference of the thickness of a photoresist layer. Thus, the overlapping portion OA in each of the first mask 20, the second mask 30 and the third mask 40 is formed in the light blocking portion 42. When the first shot region S1-1 is exposed, a pattern is not formed in the overlapping region D1. When the second shot region S1-2 is exposed, a pattern is formed in the overlapping region D1. Accordingly, a double exposure may not occur, so that a quality of a display device may be improved.

Figure 7:
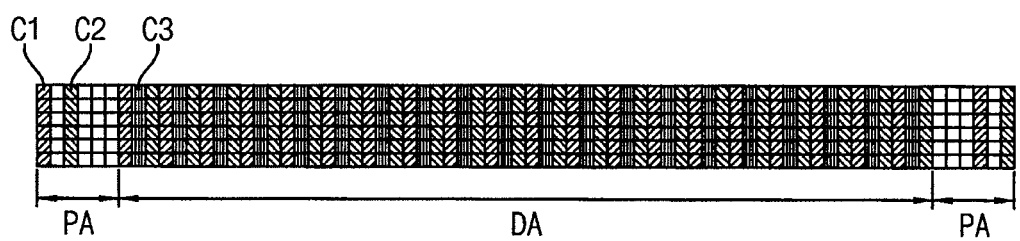
FIG. 7 is a plan view illustrating an exemplary embodiment of C in which the first color filter pattern, the second color filter pattern and the third color filter pattern in FIG. 1 according to the described technology.

FIG. 7 is an exemplary plan view illustrating the C portion in FIG. 1 where the first to third color filter patterns are formed.

Referring to FIG. 7, a first color filter pattern C1, a second color filter pattern C2 and a third color filter pattern C3 are formed. The first color filter pattern C1 may be formed by the first mask 20. The second color filter pattern C2 may be formed by the second mask 30. The third color filter pattern C3 may be formed by the third mask 40. In some embodiments, the first to third color filter patterns C1-C3 are formed alternately in a display region of a display substrate. However, the overlapping portion OA in each of the masks 20-40 is formed as a light blocking portion, so that a color filter pattern may be formed in a portion of a peripheral region PA. In addition, the first color filter pattern C1 formed in the peripheral region PA may serve as a first dam to prevent from overlapping of a sealing member and an alignment layer and the second color filter pattern C2 formed in the peripheral region PA may serve as a second dam to prevent back flow of the alignment layer.

Figure 8:
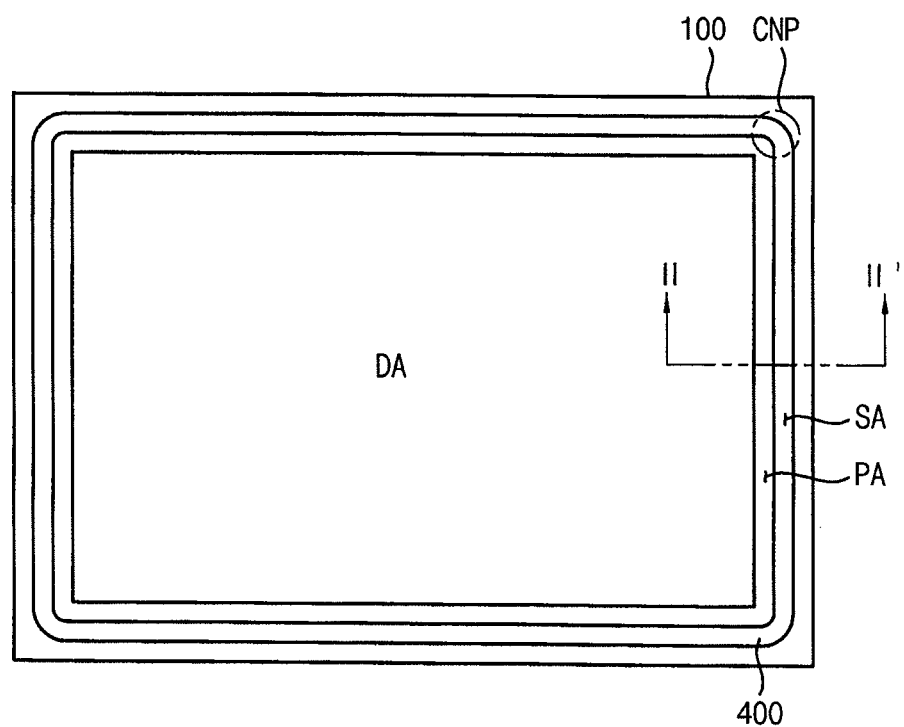
FIG. 8 is a plan view illustrating an exemplary embodiment of a display substrate according to the described technology.

FIG. 8 is an exemplary plan view illustrating a display substrate according to an exemplary embodiment of the described technology.

Referring to FIG. 8, a display substrate 501 includes a display region DA, a peripheral region PA of the display region DA, a first dam and a second dam formed in the peripheral region PA, a seal line forming region SA surrounding the peripheral region PA in an outline of the peripheral region PA, and a sealing member 400 formed in the seal line forming region SA.

The display substrate 501 can have a quadrilateral shape including four sides connected to each other. A point at which two sides of the four sides meet is defined as a vertex of the display substrate 501. The display region DA and the display substrate 501 may be similar figures. The display region DA can have a quadrilateral shape.

The sealing member 400 is formed in the seal line forming region SA. The seal line-forming region SA is an area surrounding the peripheral region PA of the display substrate 501. The sealing member 400 surrounds the peripheral region PA along the seal line-forming region SA to have a looped curve. The sealing member 400 straightly extends along the first direction D1 or the second direction D2 in the four sides of the display substrate 501. A corner portion CNP of the sealing member 400 has a curvature to surround the peripheral region PA.

Figure 9:
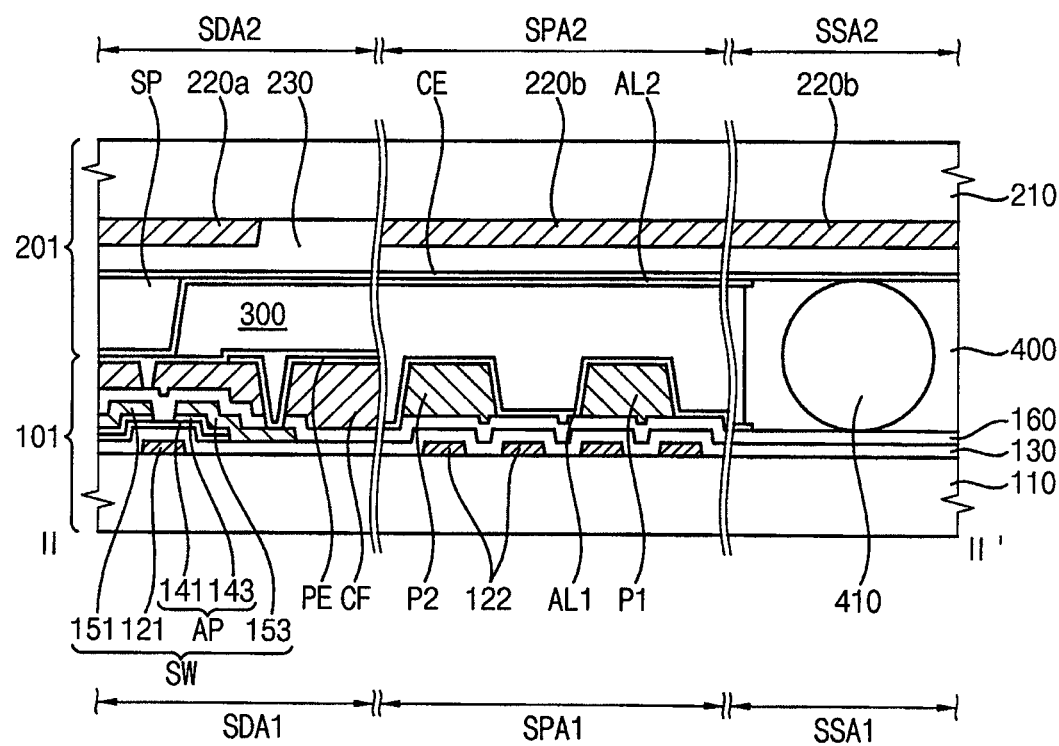
FIG. 9 is an exemplary cross-sectional view taken along the line II-II' of FIG. 8.

FIG. 9 is an exemplary cross-sectional view taken along the line II-II' of FIG. 8.

Referring to FIG. 9, the display substrate 501 illustrated referring to FIGS. 1 and 2 includes a first display substrate 101, a second display substrate 201, the liquid crystal layer 300, the pixel spacer SP and the sealing member 400. The sealing member 400 combines the first display substrate 101 with the second display substrate 201, and seals the liquid crystal layer 300 between the first and second display substrates 101 and 201.

A first base substrate 110 of the first display substrate 101 includes a first display region SDA1 corresponding to the display region DA shown FIGS. 1 and 2, a first peripheral region SPA1 corresponding to the peripheral region PA and a first seal line region SSA1 corresponding to the seal line forming region SA. A second base substrate 210 of the second display substrate 201 includes a second display region SDA2 facing the first display region SDA1, a second peripheral region SPA2 facing the first peripheral region SPA1 and a second seal line region SSA2 facing the first seal line region SSA1. For example, the first and second display regions SDA1 and SDA2 substantially overlap with each other to define the display region DA of the display panel 501, the first and second peripheral regions SPA1 and SPA2 overlap with each other to define the peripheral region PA, and the first and second seal line regions SSA1 and SSA2 substantially overlap with each other to define the seal line forming region SA.

A first dam P1 and a second dam P2 are formed on the first base substrate 110. For example, the first display substrate 101 includes the first dam P1 and the second dam formed in the first peripheral region SPA1. In addition, the sealing member 400 is interposed between the first and second seal line regions SSA1 and SSA2.

The first display substrate 101 includes a first alignment layer AU substantially uniformly formed in the first display region SDA1 and the first peripheral region SPA1 by the first dam P1. The first display substrate 101 further includes a switching element SW, the color filter CF and the pixel electrode PE which are formed in the first display region SDA1, and a metal pattern 122 formed in the first peripheral region SPA1.

The switching element SW includes a gate electrode 121, an active pattern AP, a source electrode 151 and a drain electrode 153. The gate electrode 121 is connected to a gate line (not shown) extending along the first direction D1 of the first display region SDA1. A cross-sectional structure of the gate line is substantially the same as the gate electrode 121. The active pattern AP is formed on a gate-insulating layer 130 which is formed on the gate electrode 121. The active pattern AP includes a semiconductor layer 141 substantially functioned as a channel of the switching element SW and an ohmic contact layer 143 formed on the semiconductor layer 141. The source electrode 151 is connected to a data line (not shown) extending along the second direction D2 and crossing the gate line. A cross-sectional structure of the data line is substantially the same as the source electrode 151. The drain electrode 153 is spaced apart from the source electrode 151.

The color filter CF may be formed in the first display region SDA1. The color filter CF may cover the switching element SW. The color filter CF is formed on a passivation layer 160 covering the source and drain electrodes 151 and 153. The passivation layer 160 may be omitted, and not be formed on the first base substrate 110.

The pixel electrode PE is formed on the color filter CF and contacted with the drain electrode 153 through a contact hole formed through the color filter CF and the passivation layer 160. Thus, the pixel electrode PE is electrically connected to the switching element SW.

The metal pattern 122 includes substantially the same metal layer as the gate electrode 122. The metal pattern 122 may be an antistatic pattern preventing a static electricity from being flowed into the first display region SDA1 or be a signal line pattern applying a driving signal and/or a control signal to the first display region SDA1. The metal pattern 122 is covered by the gate-insulating layer 130 and the passivation layer 160.

The first dam P1 is formed on the passivation layer 160 formed on the metal pattern 122. The first alignment layer AL1 covers the first dam P1 and the second dam P2. The heights of the first dam P1 and the second dam P2 are substantially the same as that of the color filter CF. Alternatively, the height of the first dam P1 and the second dam P2 may be greater than that of the color filter CF. The first dam P1 includes substantially the same layer as the color filter CF. When a red color filter, a green color filter and a blue color filter are formed on the first display substrate 101, the first dam P1 may include substantially the same layer as the red color filter and the second dam P2 may include substantially the same layer as the blue color filter.

The first alignment layer AL1 is formed on the pixel electrode PE. The first alignment layer AL1 is formed in the first display region SDA1 and the first peripheral region SPA1. The first alignment layer AL1 may include a polyimide based compound, a polyamic acid based compound, or in mixture thereof. The first alignment layer AL1 may extend into the first seal line region SSA1. In some embodiments, an adhesive strength between the first alignment layer AL1 and the sealing member 400 is weak so that, an area in the first seal line region SSA1 covered by the first alignment layer AL1 is much narrower than an area in which the first alignment layer AL1 is not formed. The first dam P1 may decrease an overlapping region of the first alignment layer AL1 and the sealing member 400. Thus, a lower surface of the sealing member 400 may be directly contacted with the passivation layer 160 formed on the first display substrate 101. The first alignment layer AL1 may be substantially uniformly formed in the first display region SDA1 and the first peripheral region SPA1 by the second dam P2.

The second display substrate 201 may include a second alignment layer AL2. The second display substrate 201 further includes a light-blocking pattern 220a and 220b, an overcoating layer 230 and a common electrode CE.

The light-blocking pattern 220a and 220b is formed in the second display region SDA2 and the second peripheral region SPA2. For example, the light-blocking pattern 220a and 220b may include a matrix portion 220a formed in the second display region SDA2, and an outer portion 220b connected to the matrix portion 220a and formed in the second peripheral region SPA2. The matrix portion 220a is formed in a boundary between the pixels to divide the pixels in a matrix arrangement. The outer portion 220b extends into the second seal line region SSA2 from the second peripheral region SPA2.

The overcoating layer 230 is formed on the second base substrate 210 on which the light-blocking pattern 220a and 220b is formed. The overcoating layer 230 may minimize a stepped portion between a surface of a region in which the light-blocking pattern 220a and 220b is formed and a surface of the second base substrate 210. In addition, the overcoating layer 230 may prevent impurities generated from the light-blocking pattern 220a and 220b from being flowed into the liquid crystal layer 300. The overcoating layer 230 may be not formed in the second base substrate 210 and may be omitted in the second base substrate 210.

The common electrode CE is formed on the overcoating layer 230. The common electrode CE is substantially entirely formed on the second base substrate 210. A vertical electric field is formed between the common electrode CE and the pixel electrode PE.

The second alignment layer AL2 may be directly contacted with the common electrode CE. The second alignment layer AL2 may include a polyimide based compound, a polyamic acid based compound, or in mixture thereof. The second alignment layer AL2 may be substantially uniformly formed in the second display region SDA2 and the second peripheral region SPA2. The second alignment layer AL2 may be partially formed in or extending into the second seal line region SSA2. In some embodiments, an area in the seal line region SSA2 covered by the second alignment layer AL2 is much narrower than an area in which the second alignment layer AL2 is not formed. An upper surface of the sealing member 400 may be directly contacted with the common electrode CE formed on the second display substrate 201.

The pixel spacer SP is formed in the display region DA of the display panel 501 to maintain the gap between the first and second display substrates 101 and 201 constantly. For example, the pixel spacer SP is interposed between the first display region SDA1 and the second display region SDA2. For example, the pixel spacer SP is formed on the common electrode CE of the second display region SDA2 to be covered by the second alignment layer AL2.

The sealing member 400 is interposed between the first and second seal line regions SSA1 and SSA2. The sealing member 400 may be partially overlapped with the first and second alignment layers AL1 and AL2 in a region adjacent to the first and second peripheral regions SPA1 and SPA2. The first dam P1 may minimize an area in which the sealing member 400 overlaps with the first alignment layer AL1 may be minimized, in forming the sealing member 400 on the first or second display substrates 101 or 201.

The display substrate 501 further includes a seal spacer 410 formed in the sealing member 400. The seal spacer 410 is formed in the sealing member 400 to maintain a boundary gap between the first and second display substrates 101 and 201 constantly. The seal spacer 410 may be directly contacted with each of the first and second alignment layers AL1 and AL2.

In the present exemplary embodiment, the switching element SW and the color filter CF are formed in the first display substrate 101, but not limited thereto. The switching element SW may be formed in the first display substrate 101 and the color filter CF may be formed in the second display substrate 201.

Hereinafter, a method of manufacturing the display substrate 501 shown in FIG. 9 will be illustrated referring to FIGS. 10, 11, 12, 13, 14 and 15.

Figure 14:
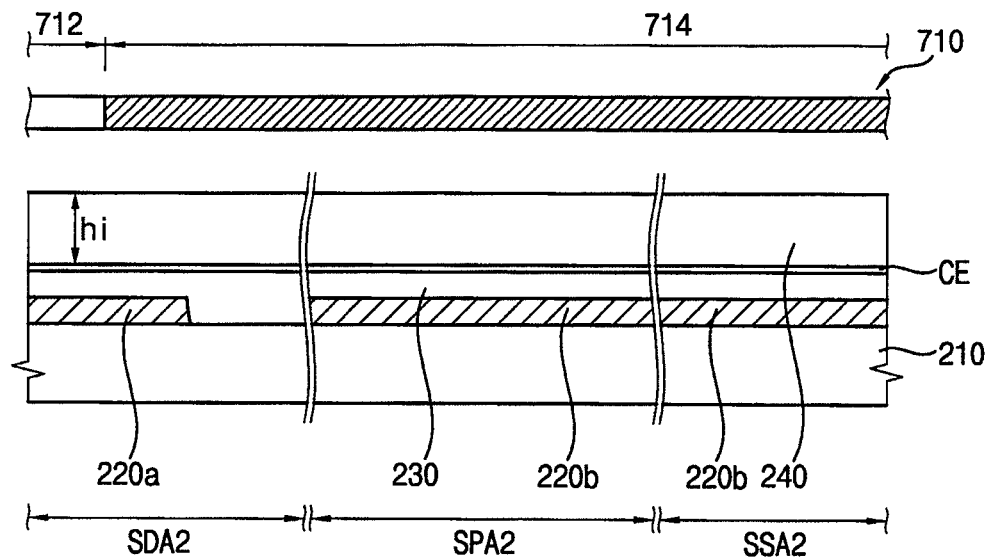
FIGS. 14 to 15 are exemplary cross-sectional views illustrating a method of manufacturing a second substrate shown in FIG. 9.
Figure 15:
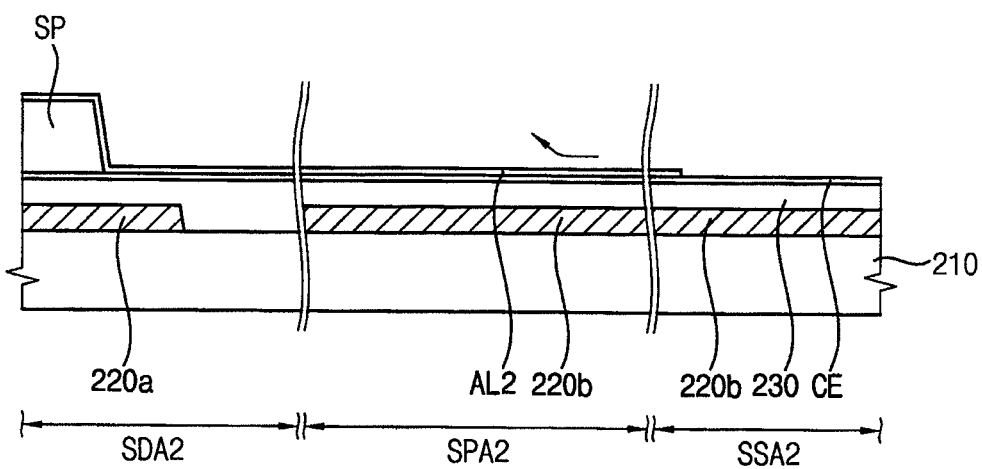

FIGS. 10 to 13 are exemplary cross-sectional views illustrating a method of manufacturing a first substrate shown in FIG. 9. FIGS. 14 to 15 are exemplary cross-sectional views illustrating a method of manufacturing a second substrate shown in FIG. 9.

Figure 10:
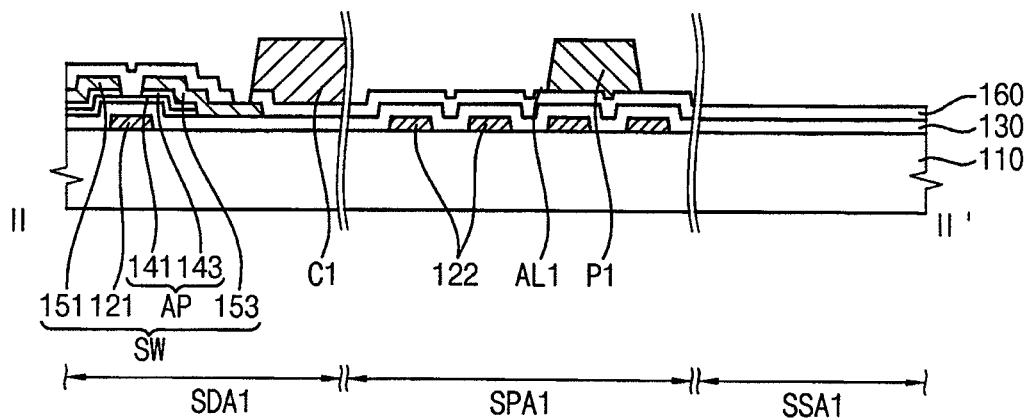
FIGS. 10 to 13 are exemplary cross-sectional views illustrating a method of manufacturing a first substrate shown in FIG. 9.

Referring to FIG. 10, a gate pattern, the gate insulating layer 130 and the active pattern AP are sequentially formed on the first base substrate 110. The gate pattern includes the gate electrode 121, the gate line connected to the gate electrode 121, and the gate pattern 122. A source pattern is formed on the first base substrate 110 on which the active pattern AP is formed. The source pattern includes the source electrode 151, the data line connected to the source electrode 151, and the drain electrode 153. The passivation layer 160 is formed on the first base substrate 110 on which the source pattern is formed.

A color filter layer is formed on the first base substrate 110 on which the passivation layer 160 is formed, and the color filter layer is patterned to form the first color filter C1 and the first dam P1. In forming the first color filter C1, the color filter CF and the passivation layer 160 on the drain electrode 153 are partially removed to form a contact hole partially exposing the drain electrode 153. The height of the first color filter C1 may be substantially the same as that of the first dam P1. Alternatively, the height of the first color filter C1 may be different from that of the first dam P1. The color layer may be formed by using a color photoresist material comprising a blue pigment, but not limited thereto. The color filter layer may be formed by using a color photoresist material comprising a red pigment or a green pigment. The first color filter C1 may be a blue color filter. The first dam P1 may prevent from overlapping an alignment layer and the sealing member 400. A first shot region S1-1 and a second shot region S1-2 may be substantially equally exposed by the same mask. Since FIG. 10 illustrates a right of the display substrate 501, the first dam P1 may be a blue color filter in FIG. 10. However, the first dam P1 may be a red color filter at a left of the display substrate 501.

Figure 11:
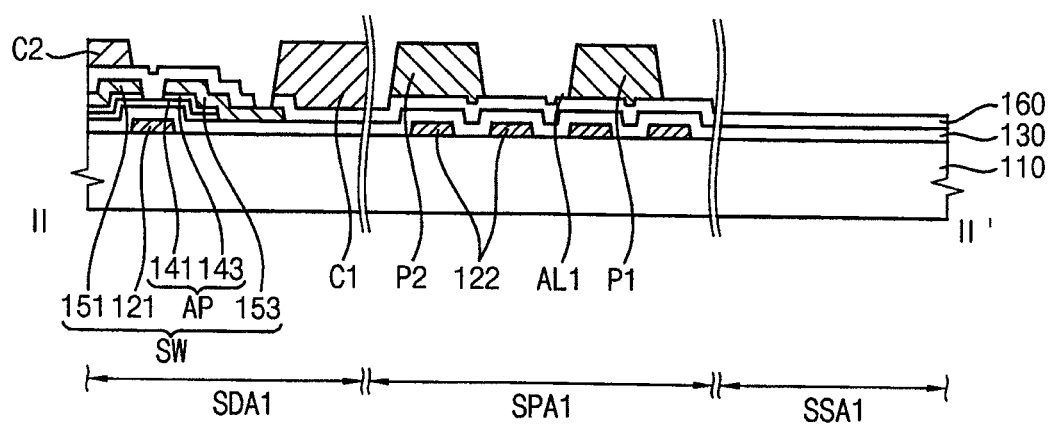

Referring to FIG. 11, a color filter layer is formed on the first base substrate 110 on which the first color filter C1 and the first dam P1 are formed, and the color filter layer is patterned to form a second color filter C2 and a second dam P2. A height of the second color filter C2 may be substantially the same as that of the second dam P2. Alternatively, the height of the second color filter C2 may be different from that of the second dam P2. The color layer may be formed by using a color photoresist material comprising a red pigment, but not limited thereto. The color filter layer may be formed by using a color photoresist material comprising a blue pigment or a green pigment. The second color filter C2 may be a red color filter. A first shot region S1-1, and a second shot region S1-2 may be equally exposed by the same mask. Since FIG. 11 illustrates a right of the display substrate 501, the second dam P2 may be a red color filter in FIG. 11. However, the second dam P2 may be a blue color filter at a left of the display substrate 501.

Figure 12:
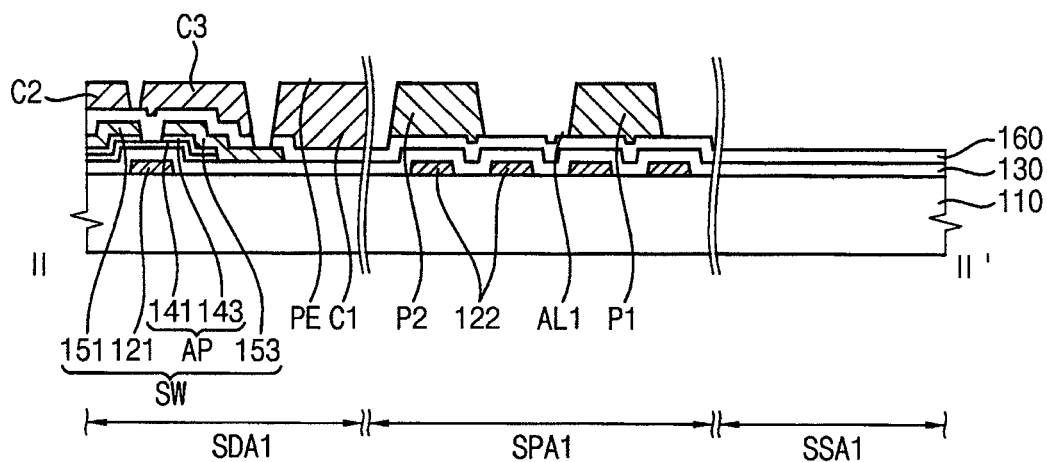

Referring to FIG. 12, a color filter layer is formed on the first base substrate 110 on which the first color filter C1, the first dam P1, the second color filter C2 and the second dam P2 are formed, and the color filter layer is patterned to form a second color filter C3. The color layer may be formed by using a color photoresist material comprising a green pigment, but not limited thereto. The color filter layer may be formed by using a color photoresist material comprising a blue pigment or a red pigment.

Figure 13:
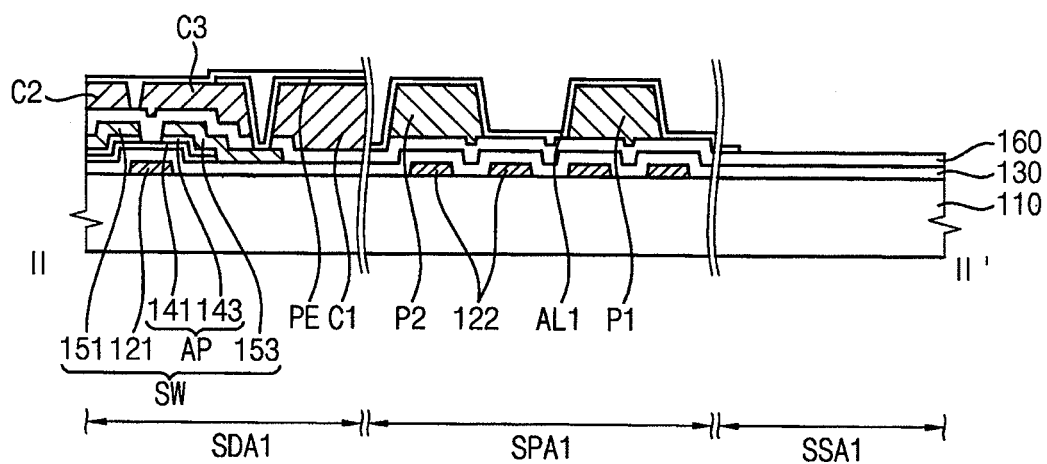

Referring to FIG. 13, the pixel electrode PE is formed on the first base substrate 110 on which the first color filter C1, the second color filter C2, the third color filter C3, the first dam P1 and the second dam P2 are formed. The pixel electrode PE is formed in the first display region SDA1. In forming the pixel electrode PE, an electrode pattern (not shown) may be formed from substantially the same layer as the pixel electrode PE in the first peripheral region SPA1. The electrode pattern may not be formed on the first dam P1 and the second dam P2. When the electrode pattern is formed on the first dam P1 and the second dam P2, an electric short circuit is generated between the electrode pattern and the common electrode CE to generate a wrong signal.

The first alignment layer AL1 is formed on the first base substrate 110 on which the pixel electrode PE is formed. The first alignment layer AL1 is formed in the first peripheral region SPA1 and the first display region SDA1. The first alignment layer AL1 is formed via substantially the same process as the second alignment layer AL2 except for being formed on the first base substrate 110. The second dam P2 minimizes a rolling of the first alignment layer AL1 toward the first display region SDA1 from the first peripheral region SPA1, so that the first alignment layer ALA may be uniformly formed in the first display region SDA1. Therefore, the first display substrate 101 shown in FIG. 9, on which the first alignment layer AL1 is uniformly formed in the first display region SDA1, is manufactured.

FIGS. 14 to 15 are cross-sectional views illustrating a method of manufacturing a second substrate shown in FIG. 9.

Referring to FIG. 14, after the light-blocking pattern 220a and 220b is formed on the second base substrate 210, the overcoating layer 230 and the common electrode CE are sequentially formed on the second base substrate 210 on which the light-blocking pattern 220a and 220b is formed.

A light-blocking layer is formed on the second base substrate 210 and is patterned to form the light-blocking pattern 220a and 220b. The matrix portion 220a of the light-blocking pattern 220a and 220b is formed in the second display region SDA2, and the outer portion 220b is formed in the second peripheral region SPA2 and the second seal line region SSA2. Each of the overcoating layer 230 and the common electrode CE is substantially entirely formed on the second base substrate 210 on which the light-blocking pattern 220a and 220b is formed.

A photo layer 240 is formed on the second base substrate 210 on which the common electrode CE is formed, and a mask 710 is formed over the photo layer 240.

The photo layer 240 includes an organic material having photosensitivity. The photo layer 240 may include a negative-type photoresist layer, which is hardened by light. The thickness hi of the photo layer 240 may be greater than the height of the pixel spacer SP.

The mask 710 includes a light-transmissive portion 712 and a light-blocking portion 714. The light-transmissive portion 712 may correspond to a forming region of the pixel spacer SP in the second display region SDA2. The light-blocking portion 714 may correspond to a remaining region except for the forming regions. When the light is provided to the mask 710, the light passes through the light-transmissive portion 712 to be provided to the photo layer 240 and the light is blocked by the light-blocking portion 714 not to be provided to the photo layer 240.

Referring to FIG. 15, the photo layer 240 receiving the light is developed to form the pixel spacer SP. The second alignment layer AL2 is formed on the second base substrate 210 on which the pixel spacer SP is formed.

The second alignment layer AL2 may be formed via jetting an ink including the raw material of the second alignment layer AL2 on the second base substrate 210. The second alignment layer AL2 may be formed via additionally rubbing a coating layer coated by the raw material of the second alignment layer AL2 according to a liquid crystal mode of the liquid crystal layer 300. The raw material of the second alignment layer AL2 may include a polyimide based compound and/or a polyamic acid based compound. Alternatively, the second alignment layer may be formed via rolling the raw material using a roller. Therefore, the second display substrate 201 shown in FIG. 9, on which the second alignment layer AL2 is uniformly formed in the second display region SDA2, may be manufactured.

Figure 16:
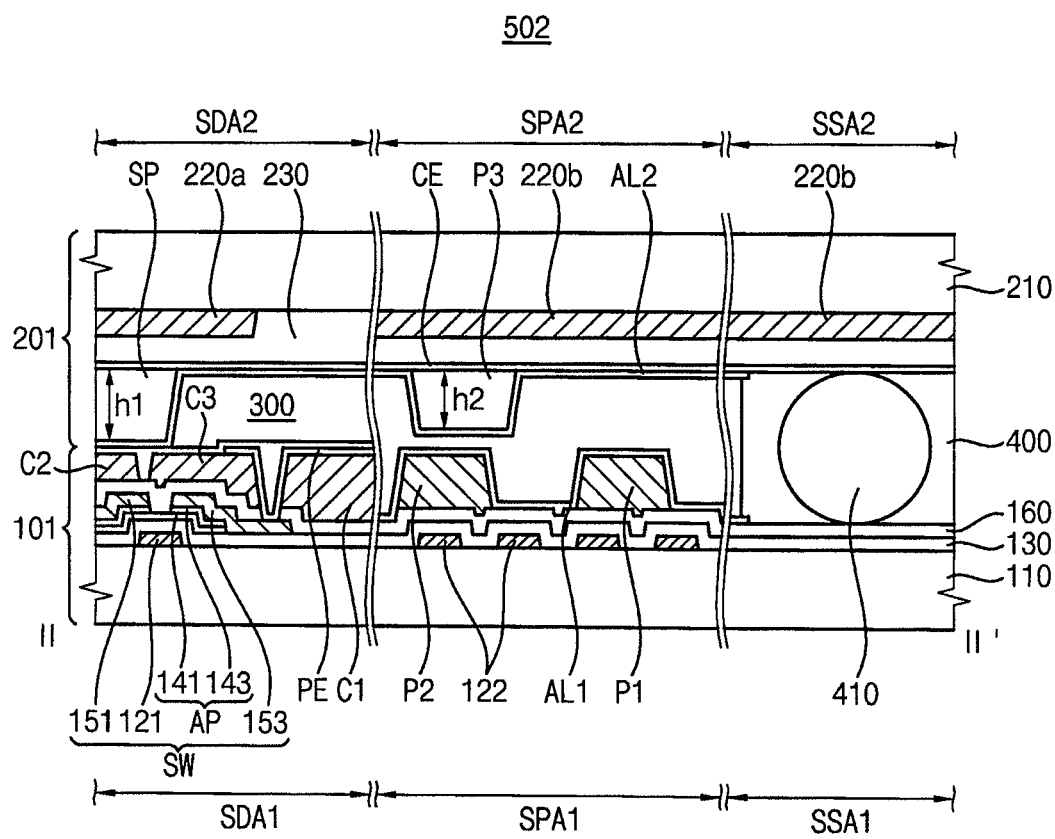
FIG. 16 is a plan view illustrating another exemplary embodiment of a display substrate according to the described technology.

FIG. 16 is a plan view illustrating another exemplary embodiment of a display substrate according to the described technology.

The display substrate according to the present exemplary embodiment is substantially same as the display substrate according to the previous exemplary embodiment except for a third dam P3 formed on the second base substrate 210.

Referring to FIG. 16, the display substrate 502 illustrated referring to FIGS. 1 and 2 includes a first display substrate 101, a second display substrate 201, the liquid crystal layer 300, the pixel spacer SP and the sealing member 400. The sealing member 400 combines the first display substrate 101 with the second display substrate 201, and seals the liquid crystal layer 300 between the first and second display substrates 101 and 201.

The second display substrate 201 may include a second alignment layer AL2 substantially uniformly formed in a second display region SDA2 and a second peripheral region SPA2 by the third dam P3. The second display substrate 201 further includes a light-blocking pattern 220a and 220b, an overcoating layer 230 and a common electrode CE.

The third dam P3 may be formed on the common electrode CE. The third dam P3 may be formed in the second peripheral region SPA2. The third dam P3 may be formed on the substantially same layer as a pixel spacer SP formed in the second display region SDA2.

The second alignment layer AL2 may be formed on the third dam P3. The second alignment layer AL2 may be directly contacted with the common electrode CE. The second alignment layer AL2 may include a polyimide based compound, a polyamic acid based compound, or in mixture thereof. The second alignment layer AL2 may be substantially uniformly formed in the second display region SDA2 and the second peripheral region SPA2. The second alignment layer AL2 may be partially formed in or extending into the second seal line region SSA2. However, preferably, an area in the seal line region SSA2 covered by the second alignment layer AL2 is much narrower than an area in which the second alignment layer AL2 is not formed. An upper surface of the sealing member 400 may be directly contacted with the common electrode CE formed on the second display substrate 201.

The pixel spacer SP is formed in the display region DA of the display panel 502 to maintain the gap between the first and second display substrates 101 and 201 constantly. For example, the pixel spacer SP is interposed between the first display region SDA1 and the second display region SDA2. For example, the pixel spacer SP is formed on the common electrode CE of the second display region SDA2 to be covered by the second alignment layer AL2. A first height h1 of the pixel space SP may be substantially the same as a second height h2 of the third dam P3. Alternately, the second height h2 may be lower than the first height h1. In some embodiments, the thickness of the third dam P3 is much thicker than a thickness of second alignment layer AL2.

Hereinafter, a method of manufacturing the display substrate 501 shown in FIG. 16 will be illustrated referring to FIGS. 17 and 18.

Figure 17:
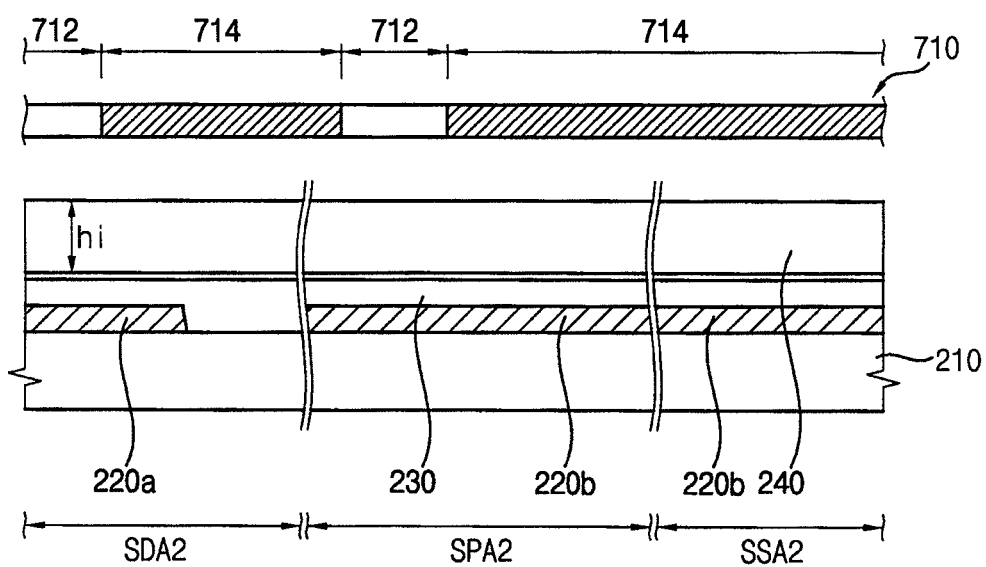
FIGS. 17 to 18 are exemplary cross-sectional views illustrating a method of manufacturing a second substrate shown in FIG. 16.
Figure 18:
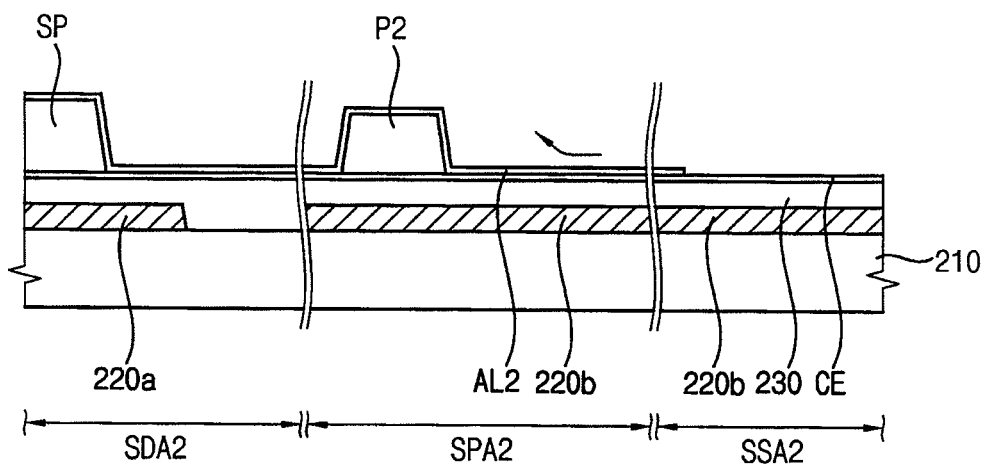

FIGS. 17 to 18 are cross-sectional views illustrating a method of manufacturing a second substrate shown in FIG. 16.

Referring to FIG. 17, after the light-blocking pattern 220a and 220b is formed on the second base substrate 210, the overcoating layer 230 and the common electrode CE are sequentially formed on the second base substrate 210 on which the light-blocking pattern 220a and 220b is formed.

A light-blocking layer is formed on the second base substrate 210 and is patterned to form the light-blocking pattern 220a and 220b. The matrix portion 220a of the light-blocking pattern 220a and 220b is formed in the second display region SDA2, and the outer portion 220b is formed in the second peripheral region SPA2 and the second seal line region SSA2. Each of the overcoating layer 230 and the common electrode CE may be substantially entirely formed on the second base substrate 210 on which the light-blocking pattern 220a and 220b is formed.

A photo layer 240 is formed on the second base substrate 210 on which the common electrode CE is formed, and a mask 710 is formed over the photo layer 240.

The photo layer 240 includes an organic material having photosensitivity. The photo layer 240 may include a negative-type photoresist layer which is hardened by light. The thickness hi of the photo layer 240 may be greater than the first height h1 and the second height h2 or substantially same as the first height h1 and the second height h2.

The mask 710 includes a light-transmissive portion 712 and a light-blocking portion 714. The light-transmissive portion 712 may correspond to a first forming region of the pixel spacer SP and a second forming region of the third dam P3 in the second display region SDA2 and a second forming region of the second backflow-blocking pattern P2. The light-blocking portion 714 may correspond to a remaining region except for the first and second forming regions. When the light is provided to the mask 710, the light passes through the light-transmissive portion 712 to be provided to the photo layer 240 and the light is blocked by the light-blocking portion 714 not to be provided to the photo layer 240.

Referring to FIG. 18, the photo layer 240 receiving the light is developed to form the pixel spacer SP and the third dam P3. The second alignment layer AL2 is formed on the second base substrate 210 on which the pixel spacer SP and the third dam P3 are formed.

The second alignment layer AL2 may be formed via jetting an ink including the raw material of the second alignment layer AL2 on the second base substrate 210. The second alignment layer AL2 may be formed via additionally rubbing a coating layer coated by the raw material of the second alignment layer AL2 according to a liquid crystal mode of the liquid crystal layer 300. The raw material of the second alignment layer AL2 may include a polyimide-based compound and/or a polyamic acid based compound. Alternatively, the second alignment layer may be formed via rolling the raw material using a roller.

The second alignment layer AL2 is formed in the second display region SDA2 and the second peripheral region SPA2. When the raw material is substantially uniformly coated in the display region DA and the peripheral region PA of the display panel 501, the raw material does not outflow the third dam P3 and thus is not flowed backward into the second display region SDA2 although the repulsive force between the common electrode CE and the raw material is generated by the chemical characteristic of the raw material. For example, the third dam P3 may prevent the second alignment layer AL2 from being rolled toward the second display region SDA2 from the second peripheral region SPA2.

Therefore, the second display substrate 201 shown in FIG. 16, on which the second alignment layer AL2 is uniformly formed in the second display region SDA2, may be manufactured.

Figure 19:
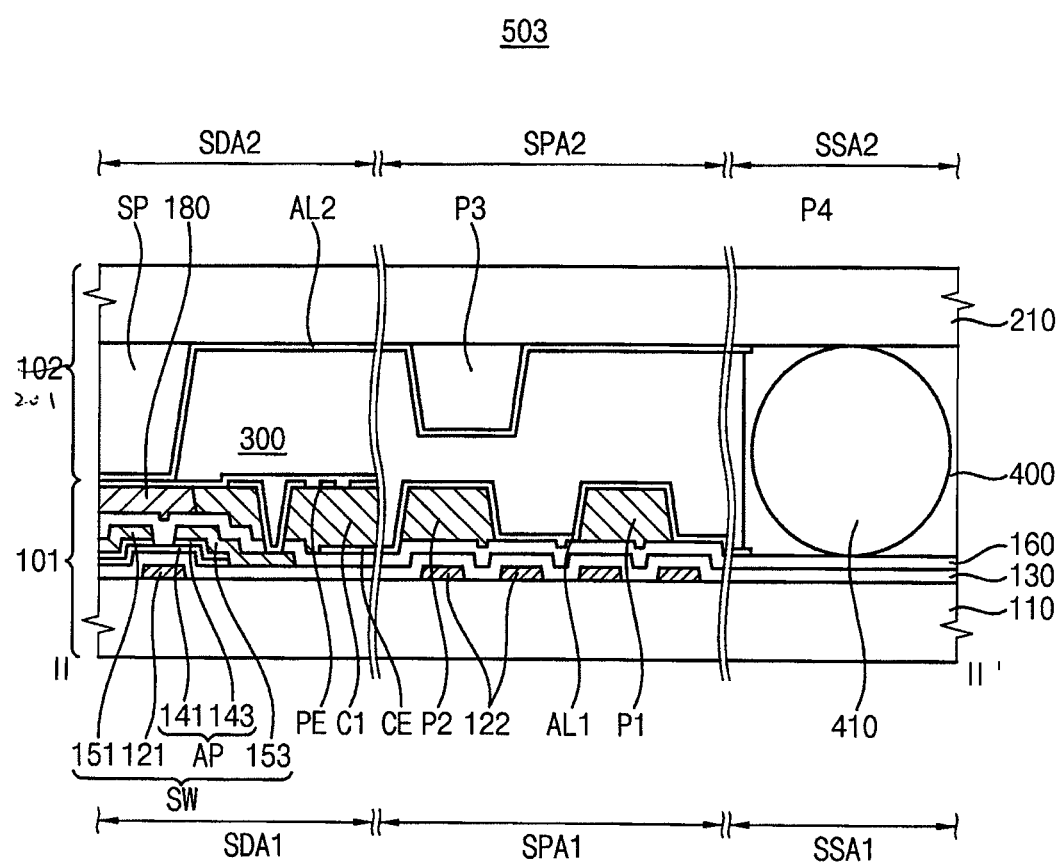
FIG. 19 is a plan view illustrating still another exemplary embodiment of a display substrate according to the described technology.

FIG. 19 is a plan view illustrating still another exemplary embodiment of a display substrate according to the described technology.

The display substrate according to the present exemplary embodiment is substantially the same as the display substrate according to the previous exemplary embodiment except for a common electrode CE and a light-blocking pattern 180 formed on a first base substrate 110.

Referring to FIG. 19, the display panel 503 may include a first display substrate 101, a second display substrate 201, a liquid crystal layer 300 and a sealing member 400. The display panel 503 may further include a seal spacer 410 formed in the sealing member 400.

The first display substrate may include the common electrode CE and the light-blocking pattern 180. The common electrode CE is formed on a passivation layer 160. A first color filter C1, a second color filter C2 and a third color filter C3 are formed on the common electrode CE, and the light-blocking pattern 180 is formed on the passivation layer 160 in a region corresponding to the switching element SW. Each of a first dam P1 and a second dam P2 of the first display substrate 101 includes substantially the same layer as the first color filter C1, the second color filter C2 and the third color filter C3.

In addition, the light-blocking pattern 180 may be formed in a region corresponding to a gate line connected to a gate electrode 121 and a data line connected to a source electrode 151, as well as the switching element SW.

The pixel electrode PE is formed on the first color filter C1, the second color filter C2 and the third color filter C3. The pixel electrode PE may include a plurality of slit electrodes. The pixel electrode PE may be insulated from the common electrode CE by the first color filter C1, the second color filter C2 and the third color filter C3. A horizontal electric field is formed in the liquid crystal layer 300 by the slit electrodes and the common electrode CE.

The second display substrate 201 may include a pixel spacer SP, a third dam P3. Each of the pixel spacer SP and the third dam P3 may be directly contacted with a second base substrate 210. The first display substrate 101 includes the first color filter C1, the second color filter C2, the third color filter C3, the light-blocking pattern 180 and the common electrode CE so that the pixel spacer SP and the third dam P3 may be directly formed on the second base substrate 210. Although an electrode pattern (not shown) including the same layer as the pixel electrode PE is formed in a first peripheral region SPA1, the common electrode CE is formed on the first base substrate 110 so that there is no electric short circuit between the common electrode CE and the electrode.

The second alignment layer AL2 may directly be contacted with each of the pixel spacer SP, the third dam P3 and a surface of the second base substrate 210.

Figure 20:
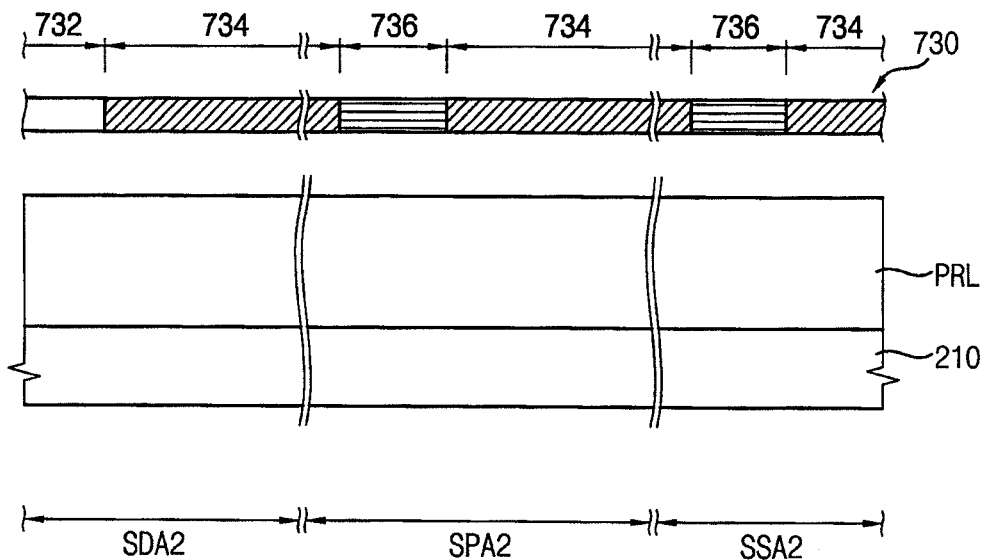
FIG. 20 is an exemplary cross-sectional view illustrating a method of manufacturing a second substrate shown in FIG. 19.

FIG. 20 is an exemplary cross-sectional view illustrating a method of manufacturing a second substrate shown in FIG. 19.

Referring to FIG. 20, a photo layer PRL is formed on the second base substrate 210 and a mask 730 is formed over the photo layer PRL. The photo layer PRL may include a negative-type photoresist layer which is hardened by light.

The mask 730 is a light-transmissive portion 732, a light-blocking portion 734 and a light-transflective portion 736. The light-transmissive portion 732 corresponds to a forming region of the pixel spacer SP. The light-transflective portion 736 corresponds to forming regions of the second backflow-blocking pattern P2 and the second spread-blocking pattern P4. A light intensity passing through the light-transmissive portion 732 is relatively more than a light intensity passing through the light-transflective portion 736, so that the height of the photo layer PRL facing the light-transmissive portion 732 is greater than that of the photo layer PRL facing the light-transflective portion 736, partially remained on the second base substrate 210 after developing the photo layer PRL. The remaining region except for the light-transmissive portion 732 and the light-transflective portion 736 corresponds to the light-blocking portion 734, and the photo layer PRL facing the light blocking part 734 is removed in developing the photo layer PRL. Thus, the pixel spacer SP and the third dam P3 may be formed.

Then, the second alignment layer AL2 is formed on the second base substrate 210 on which the pixel spacer SP and the third dam P3 are formed, so that the second display substrate 201 shown in FIG. 19 may be manufactured.

Figure 21:
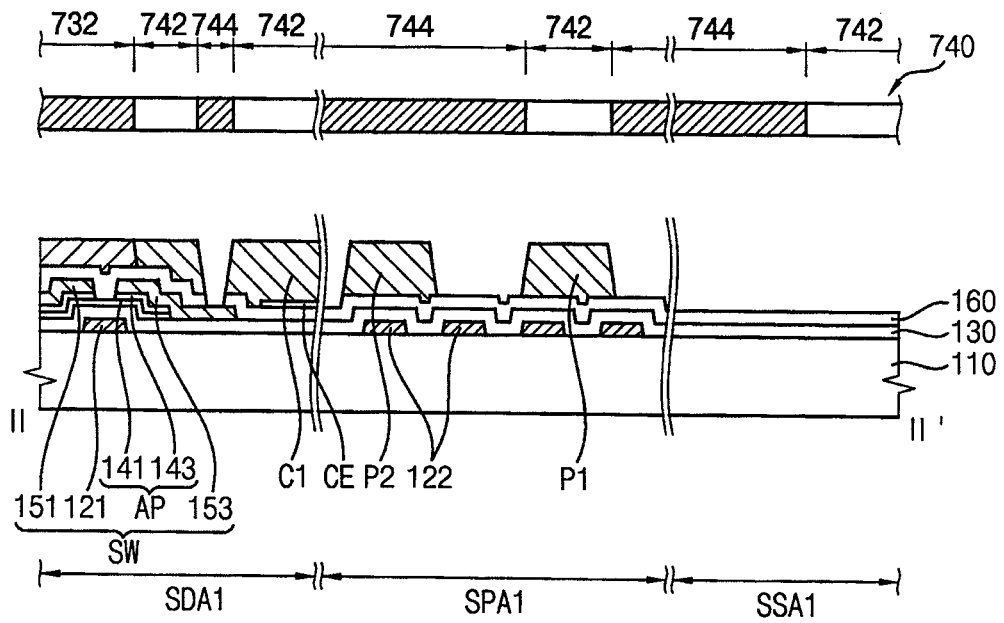
FIG. 21 is an exemplary cross-sectional view illustrating a method of manufacturing a first substrate shown in FIG. 19.

FIG. 21 is a cross-sectional view illustrating a method of manufacturing a first substrate shown in FIG. 19.

Referring to FIG. 21, after forming the switching element SW, a metal pattern 122 and the passivation layer 160 covering the switching element SW and the metal pattern 122 on the first base substrate 110, the common electrode CE may be formed on the first base substrate 110.

The light-blocking pattern 180 may be formed on the first base substrate 110, on which the common electrode CE is formed, and a color filter layer may be formed on the first base substrate 110 on which the light-blocking pattern 180 is formed.

A mask 740 is formed over the color filter layer, and the color filter layer partially receives the light according to regions and is developed to form the first color filter C1, the second color filter C2, the third color filter C3, the first dam P1 and the second dam P2. The mask 740 may include a light-transmissive portion 742 corresponding to forming regions of the first color filter C1, the second color filter C2, the third color filter C3, the first dam P1 and the second dam P2 and a light-blocking portion 744 corresponding to the remaining region except for the light-transmissive portion 742.

The pixel electrode PE is formed on the first base substrate 110 on which the color filter CF, the first backflow-blocking pattern P1 and the first spread-blocking pattern P3 are formed, and the first alignment layer AL1 is formed on the first base substrate 110 on which the pixel electrode PE is formed. Thus, the first display substrate 101 shown in FIG. 19 may be manufactured.

According to at least one of the disclosed embodiments, the dam is formed in a peripheral region of the display substrate prevent from being rolled toward the display region in forming the alignment layer.

In addition, the dam is substantially simultaneously formed in forming a pixel pattern of a pixel in the display region so that the number of manufacturing processes for the display substrate may be prevented from increasing.

The foregoing is illustrative of the invention and is not to be construed as limiting thereof. Although embodiments have been described, those skilled in the art will readily appreciate that many modifications are possible in the exemplary embodiments without materially departing from the novel teachings and advantages of the described technology. Accordingly, all such modifications are intended to be included within the scope of the claims. Therefore, it is to be understood that the foregoing is illustrative only and is not to be construed as limited to the specific exemplary embodiments disclosed, and that modifies to the disclosed exemplary embodiments, as well as other exemplary embodiments, are intended to be included within the scope of the appended claims.

What is claimed is:

1. A display substrate comprising:
    a first substrate including a first display region, a first peripheral region and a first seal-line region;
    a second substrate facing the first substrate and including a second display region, a second peripheral region and a second seal-line region;
    a sealing member formed on the first seal-line region and the second seal-line region to substantially seal the first and second substrates;
    a first color filter pattern and a second color filter pattern formed in the first display region;
    a first dam formed in the first peripheral region and adjacent to the first seal-line region; and
    a second dam formed in the first peripheral region and adjacent to the first display region, wherein the first and second dams are formed of the same material as the first and second color filter patterns respectively, and
    wherein the first dam is disposed on the same layer as the second dam, and
    wherein the first display substrate includes an alignment layer, which includes a polyimide based compound or a polyamic acid based compound; and wherein a portion of the alignment layer formed directly above and in direct contact with the first and second dams which are formed in the first peripheral region corresponds to the shape of the first and second dams.

2. The display substrate of claim 1, further comprising:
    the first color filter pattern formed at least partially of a red photoresist material;
    the second color filter pattern formed at least partially of a green photoresist material; and
    a third color filter pattern formed at least partially of a blue photoresist material.

3. The display substrate of claim 1, wherein the first substrate further comprises:
    a pixel electrode formed on the first and second color filter patterns; and
    a switching element formed below the first and second color filter patterns and electrically connected to the pixel electrode.

4. The display substrate of claim 1, wherein the second substrate further comprises a light-blocking member formed in the second display region and the second peripheral region to substantially block a light.

5. The display substrate of claim 2, wherein the first and second dams are formed on the same layer as the first, second and third color filter patterns.

6. The display substrate of claim 5, wherein the distance between the first and second dams is substantially the same as the width of one color filter pattern.

7. The display substrate of claim 5, wherein the first dam is formed of the same material as the first color filter pattern in a left side of the display substrate and formed of the same material as the third color filter pattern in a right side of the display substrate.

8. The display substrate of claim 5, wherein the second dam is formed of the same material as the third color filter pattern in a left side of the display substrate and formed of the same material as the first color filter pattern in a right side of the display substrate.

9. The display substrate of claim 2, wherein the first substrate further comprises:
    a pixel electrode formed on the first, second and third color filter patterns;
    a switching element formed under the first, second and third color filter patterns and electrically connected to the pixel electrode; and
    a light-blocking member formed in the first display region and the first peripheral region to substantially block a light.

10. The display substrate of claim 9, wherein the first and second dams are formed on the same layer as the first, second and third color filter patterns.

11. The display substrate of claim 10, wherein the distance between the first and second dams is substantially the same as the width of one color filter pattern.

12. The display substrate of claim 11, wherein the first dam is formed of the same material as the first color filter pattern in a left side of the display substrate and formed of the same material as the third color filter pattern in a right side of the display substrate.

13. The display substrate of claim 11, wherein the second dam is formed of the same material as the third color filter pattern in a left side of the display substrate and is formed of the same material as the first color filter pattern in a right side of the display substrate.

14. A method of manufacturing a display substrate, the method comprising:
    forming a first color filter pattern from a red photoresist material in a first display region and a first peripheral region of a first substrate, the first substrate comprising the first display region, the first peripheral region and a first seal-line region;

forming a second color filter pattern from a green photoresist material in the first display region;

forming a third color filter pattern from a blue photoresist material in the first display region and the first peripheral region; and placing a second substrate on the first substrate to face each other, the second substrate comprising a second display region, a second peripheral region and a second seal-line region, forming a first dam in the first peripheral region and adjacent to the first seal line re ion and a second dam in the first peripheral region and adjacent to the first display region, wherein the first and second dams are formed of the same material as the first and third color filter patterns, respectfully, wherein the first dam is disposed on the same layer as the second dam, and wherein the second substrate includes an alignment layer, which includes a polyimide based compound or a polyamic acid based compound; and wherein a portion of the alignment layer formed directly above and in direct contact with the first and second dams which are formed in the first peripheral region corresponds to the shape of the first and second dams.

15. The method of claim 14, wherein the forming of the first color filter pattern and the forming of the third color filter pattern comprises using a mask whose overlapping portion is formed as a light-blocking portion.

16. The method of claim 14, wherein the distance between the first and second dams is substantially the same as the width of one color filter pattern.

17. The method of claim 14, wherein the first dam is formed of the same material as the first color filter pattern in a left side of the display substrate and formed of the same material as the third color filter pattern in a right side of the display substrate.

18. The method of claim 14, wherein the second dam is formed of the same material as the third color filter pattern in a left side of the display substrate and formed of the same material as the first color filter pattern in a right side of the display substrate.

19. The method of claim 14, further comprising:

forming a light-blocking member between the color filter patterns of the first display region and the first peripheral region to substantially block a light.

20. The display substrate of claim 1, wherein the alignment layer of the second display substrate does not cover the second dam.

* * * * *